US009400044B2

(12) United States Patent
Wadhva et al.

(10) Patent No.: US 9,400,044 B2
(45) Date of Patent: Jul. 26, 2016

(54) MECHANICALLY ACTUATED POSITIVE LOCKING DIFFERENTIAL

(71) Applicant: Eaton Corporation, Cleveland, OH (US)

(72) Inventors: Ashish Wadhva, Pune (IN); Andrew Nathan Edler, Homer, MI (US); Patrick John McMillan, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 34 days.

(21) Appl. No.: 14/577,798

(22) Filed: Dec. 19, 2014

(65) Prior Publication Data

US 2015/0105210 A1 Apr. 16, 2015

Related U.S. Application Data

(63) Continuation of application No. PCT/US2014/019198, filed on Feb. 28, 2014.

(60) Provisional application No. 61/891,017, filed on Oct. 15, 2013.

(51) Int. Cl.
*F16H 48/24* (2006.01)
*F16H 48/08* (2006.01)
*F16H 48/20* (2012.01)

(52) U.S. Cl.
CPC .............. *F16H 48/24* (2013.01); *F16H 48/08* (2013.01); *F16H 2048/204* (2013.01)

(58) Field of Classification Search
CPC ........................... F16H 48/24; F16H 2048/204
See application file for complete search history.

(56) References Cited

U.S. PATENT DOCUMENTS

| 2,624,216 | A | * | 1/1953 | Nielsen | F16H 48/08 475/87 |
| 3,606,803 | A | | 9/1971 | Ottemann | |
| RE28,004 | E | | 5/1974 | Ottemann | |
| 3,831,462 | A | | 8/1974 | Baremor | |
| 4,206,662 | A | * | 6/1980 | Manz | F16H 48/08 475/232 |
| 4,290,321 | A | * | 9/1981 | Wilson | F16H 48/22 192/93 A |
| 6,319,166 | B1 | | 11/2001 | Kyle et al. | |
| 7,264,569 | B2 | | 9/2007 | Fox | |
| 7,438,661 | B2 | | 10/2008 | Kyle et al. | |
| 8,167,763 | B2 | | 5/2012 | Curtis | |
| 2010/0304916 | A1 | | 12/2010 | Curtis | |

OTHER PUBLICATIONS

International Search Report and Written Opinion mailed Jul. 10, 2014 for PCT/US2014/019198, pp. 1-13.

* cited by examiner

*Primary Examiner* — Sherry Estremsky
(74) *Attorney, Agent, or Firm* — Mei & Mark LLP

(57) ABSTRACT

A differential comprises a first side gear and a second side gear facing the first side gear. A pinion gear set can be between the first side gear and the second side gear. A cam plate comprises a ramped side facing a ramped side of the first side gear. A first lock plate comprises a first side abutting a second side of the cam plate. The first lock plate further comprises a toothed side. A second lock plate comprises a toothed side facing the toothed side of the first lock plate.

18 Claims, 8 Drawing Sheets

MECHANICALLY ACTUATED POSITIVE LOCKING DIFFERENTIAL

This is a continuation of Application No. PCT/US2014/019198, filed Feb. 28, 2014, which claims the benefit of U.S. provisional application Ser. No. 61/891,017, filed Oct. 15, 2013, which are incorporated herein by reference in their entireties.

FIELD

This application relates to differentials, and more specifically to mechanical locking differentials designed to sense wheel speed and automatically lock the device from differentiating rotation.

BACKGROUND

Existing mechanical locking differentials (M-lockers) are designed to automatically lock the differential when a difference in wheel speed is sensed above a predetermined value. However, the existing design uses friction disks in a wet clutch pack, thus requiring fluid lubrication for engagement. The fluid is subject to degradation and its properties can vary with temperature and degradation.

SUMMARY

The apparatus disclosed herein overcome the above disadvantages and improves the art by way of a differential which can comprise a first side gear and a second side gear facing the first side gear. A pinion gear set can be between the first side gear and the second side gear. A cam plate comprises a ramped side facing a ramped side of the first side gear. A first lock plate comprises a first side abutting a second side of the cam plate. The first lock plate further comprises a toothed side. A second lock plate comprises a toothed side facing the toothed side of the first lock plate.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Reference will now be made in detail to the examples which are illustrated in the accompanying drawings. Wherever possible, the same reference numbers will be used throughout the drawings to refer to the same or like parts. Directional references such as "left," "right," "up," and "down" are for ease of reference to the figures.

In an open mode, a differential is configured to allow two wheels on a motor vehicle to operate at different speeds. In a locked mode, the two wheels are locked so that they rotate at the same speed. One torque path, for a front wheel drive (FWD) vehicle, may include torque transfer from an engine to a transmission to a power transfer unit to a drive shaft to a pinion gear to a ring gear around a differential case to a pinion shaft 101 within the differential. As the pinion shaft 101 rotates, affiliated pinion gears 103 and 104 can transfer differentiated or undifferentiated torque to meshing side gears 190 and 110. The side gears have internal splines 112 and 192 to transfer torque to externally splined drive axles. Torque is then transferred to affiliated wheels. Since this torque path, as well as rear wheel drive (RWD) and all wheel drive (AWD or 4WD) torque paths, are known, the vehicle driveline is not illustrated. The ring gear and differential case are also not illustrated. Despite the specific reference to FWD, RWD, and AWD systems, it is to be understood that the differential may be used in any suitable environment requiring a differential rotation for two shafts.

A mechanical locking differential (M-locker) uses a mechanical device, as opposed to a solenoid or hydraulic device, to go between the locked and open modes. The mechanical device can comprise, for example, one of those described in U.S. Pat. Nos. 6,319,166, 7,438,661, and 8,167,763, assigned to Eaton Corporation and incorporated by reference herein in their entireties.

Figure 1:
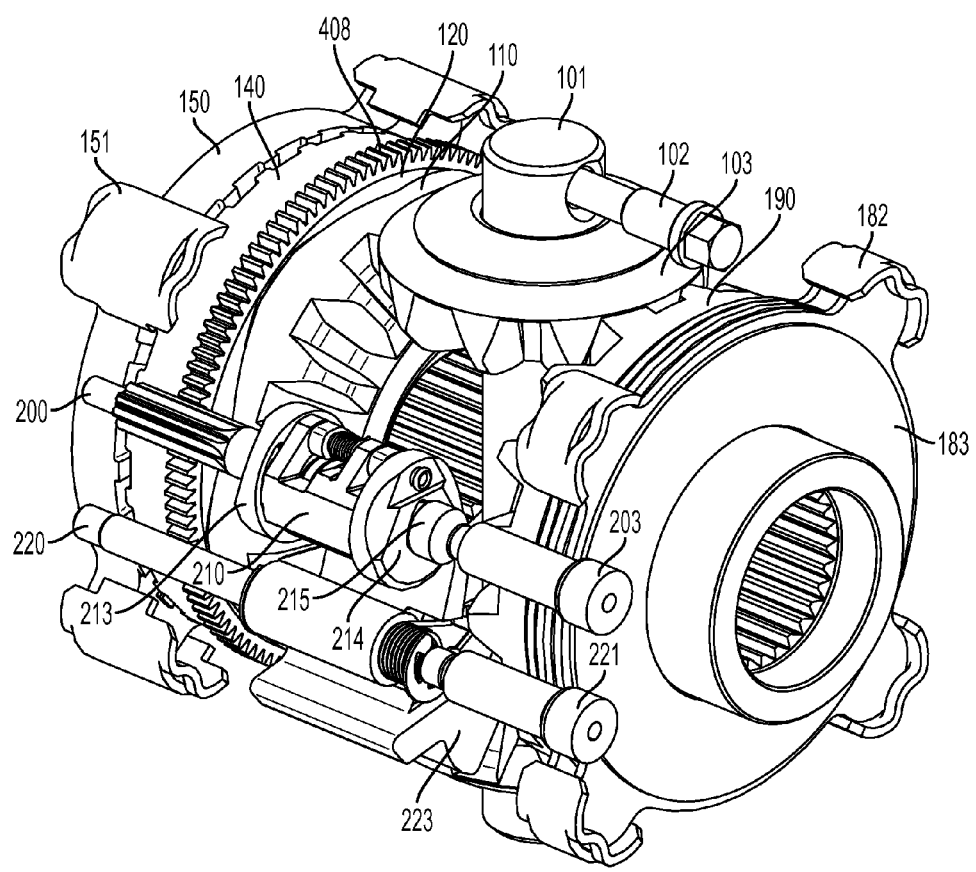
FIG. 1 is a view of the internal components of a differential having the case and ring gear removed.
Figure 2:
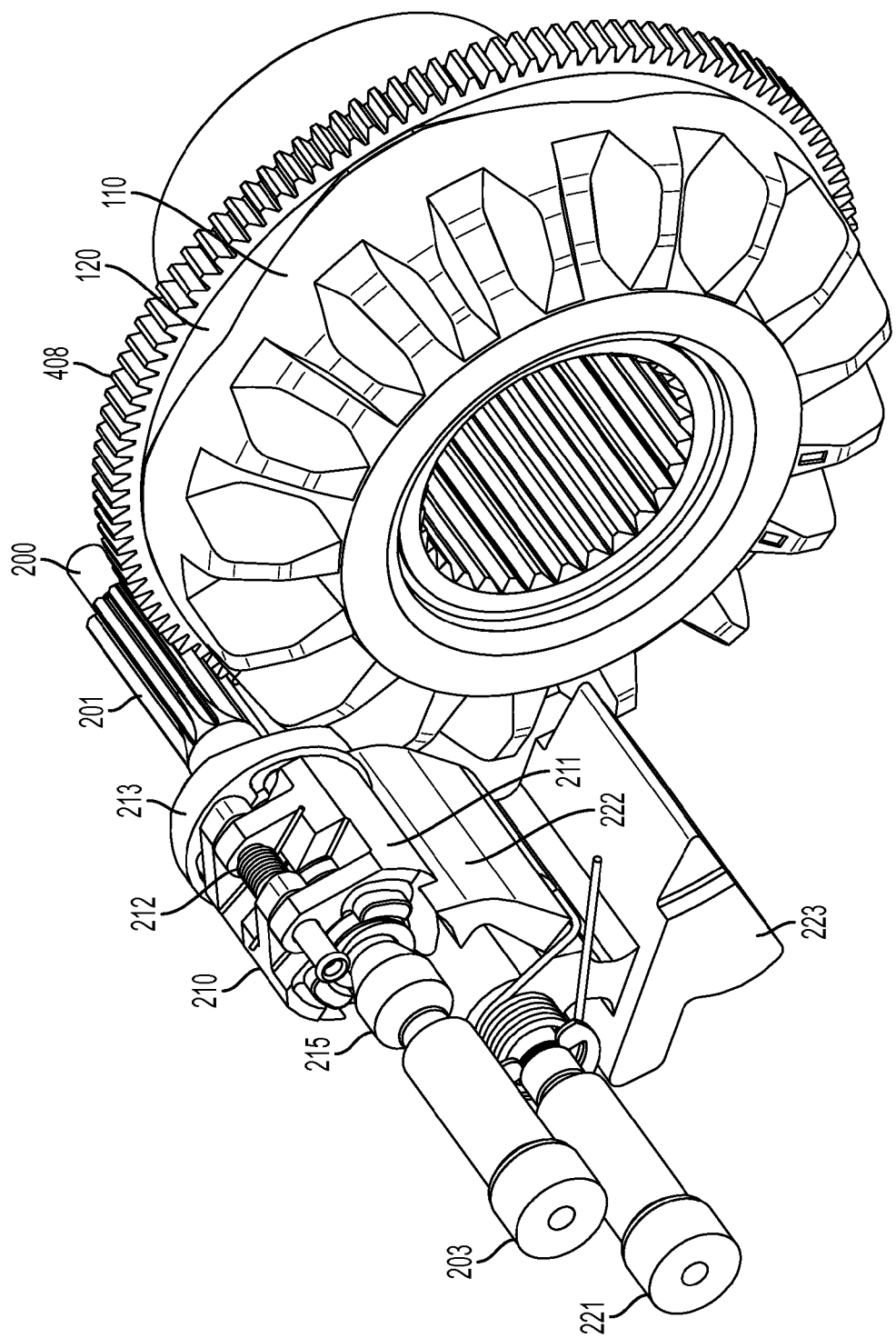
FIG. 2 is an example of an engagement mechanism in relation to a cam plate and side gear.
Figure 3:
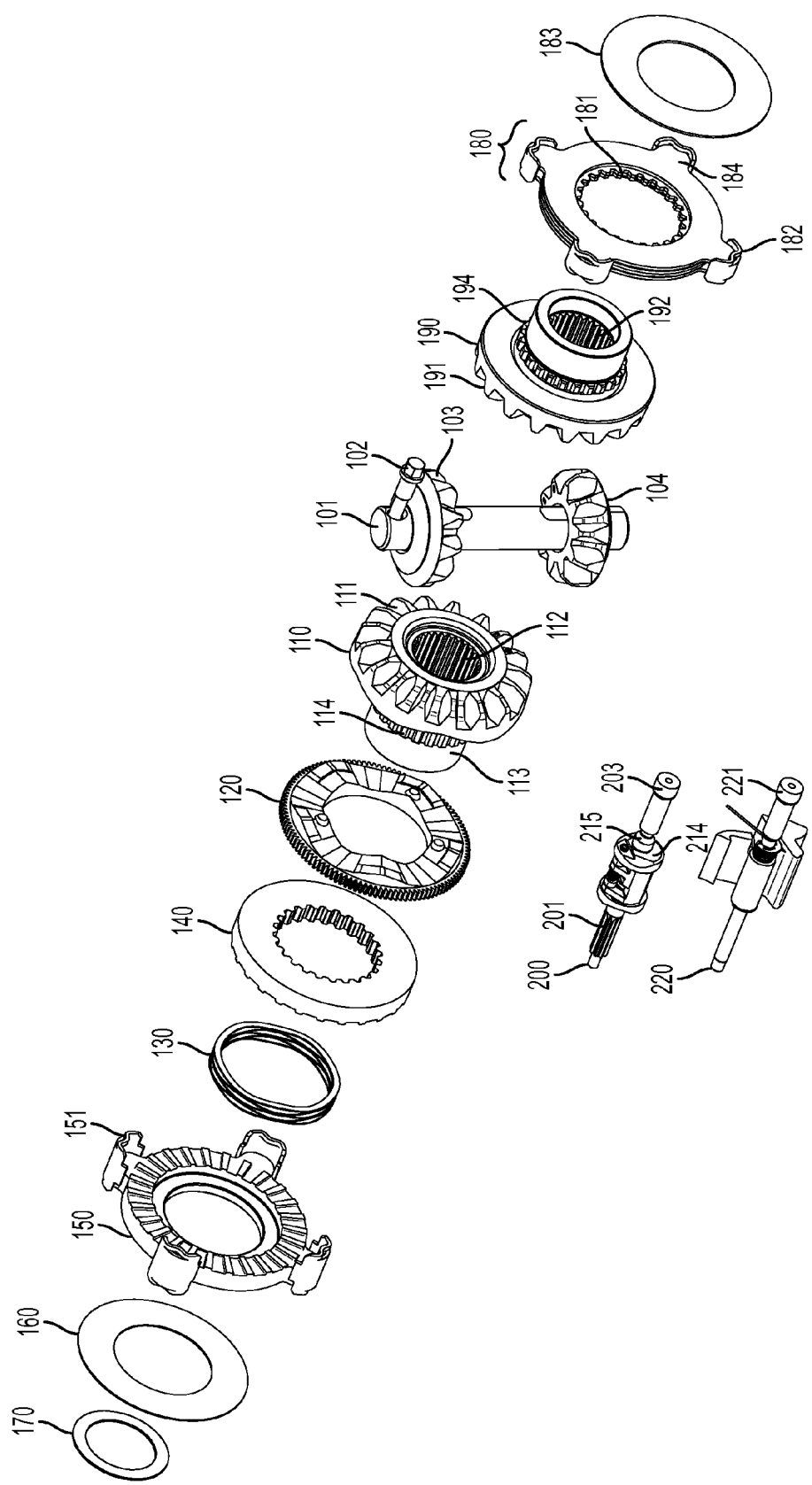
FIG. 3 is an exploded view of the differential of FIG. 1.

In the example shown in FIGS. 1-3, the mechanical device comprises an engagement mechanism, which can comprise a shaft having a first end 200 and a second end 203, both for coupling to the differential case. The shaft may include a shaft gear 201. End plates 213 and 214 may have flyweights 210 and 211 between them and a flyweight spring 212 may bias the flyweights 210 and 211. At least end plate 214 engages with a cone clutch 215. The shaft may rotate with the cam plate 120 via the shaft gear teeth 201 in mesh with rim teeth 408. When the shaft rotates due to differential action and the rotation speed is above a predetermined value, the flyweights 210 and 211 spin up. The centrifugal force must be enough to overcome the biasing force of the flyweight spring 212. The rotation must also be sufficient to overcome the grip between the end plate 214 and the cone clutch 215.

In order to lock the differential (exit open mode), at least one of the flyweights 210 or 211 must engage with the pawl 222 on a lockout mechanism on the second shaft. The second shaft has a first end 220 and a second end 221, both for coupling with the differential case. If the vehicle travels over a predetermined speed, the centrifugal force on the lockout causes a counterweight 223 to pull the pawl 222 out of the available range of the flyweights 210 and 211 and the differential cannot enter the locked mode. It can only operate in the open mode. The described example is not meant to limit the mechanical device for locking or unlocking the differential described herein. Other mechanical devices are used in the alternative with the differential described herein.

FIGS. 1 and 3 show the engagement mechanism in an un-activated state, such as when the differential is stationary, or when operating under a predetermined differential speed such as below 100 RPMs. The flyweights 210 and 211 are biased in a closed position.

In FIG. 2, the end plate 214 is absent for clarity. The flyweights 210 and 211 have spun-up and the pawl 222 has caught against a step in flyweight 211. This locks the first shaft from rotation. The shaft gears 201 are geared to rim teeth 408 of the cam plate 120. The locking creates sufficient force to move the cam plate 120. Further discussion of engagement mechanisms and their operation can be understood from examples such as U.S. Pat. Nos. 6,319,166, 7,438,661, and 8,167,763.

Figure 4A:
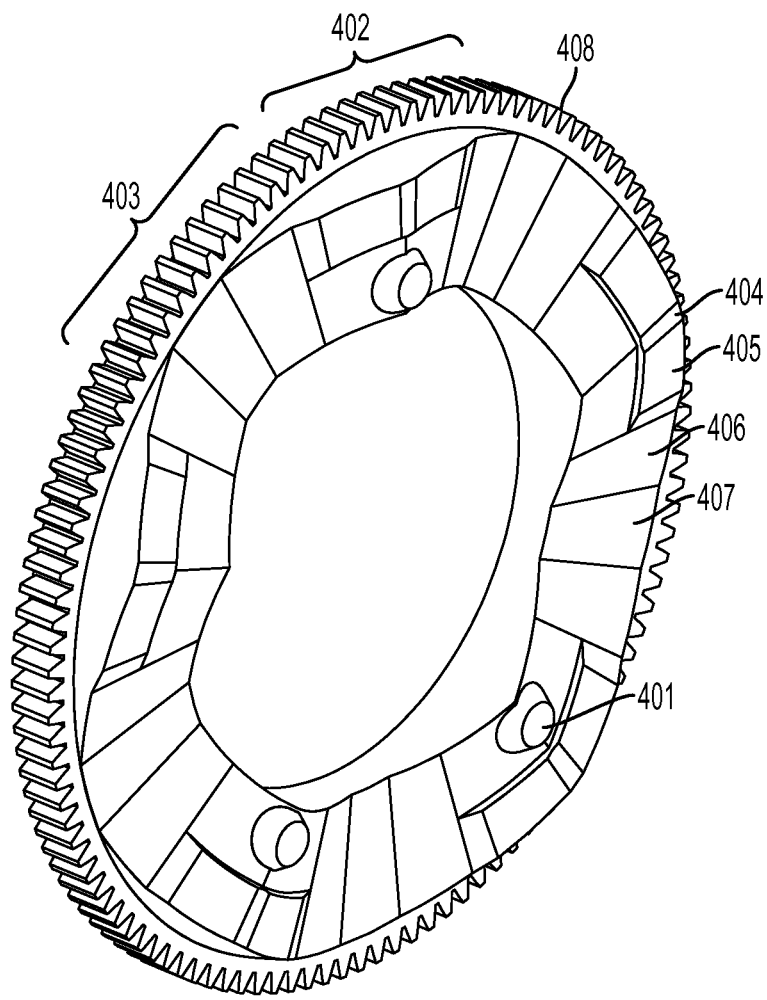
FIG. 4A is a perspective view of a first side of a cam plate.
Figure 4B:
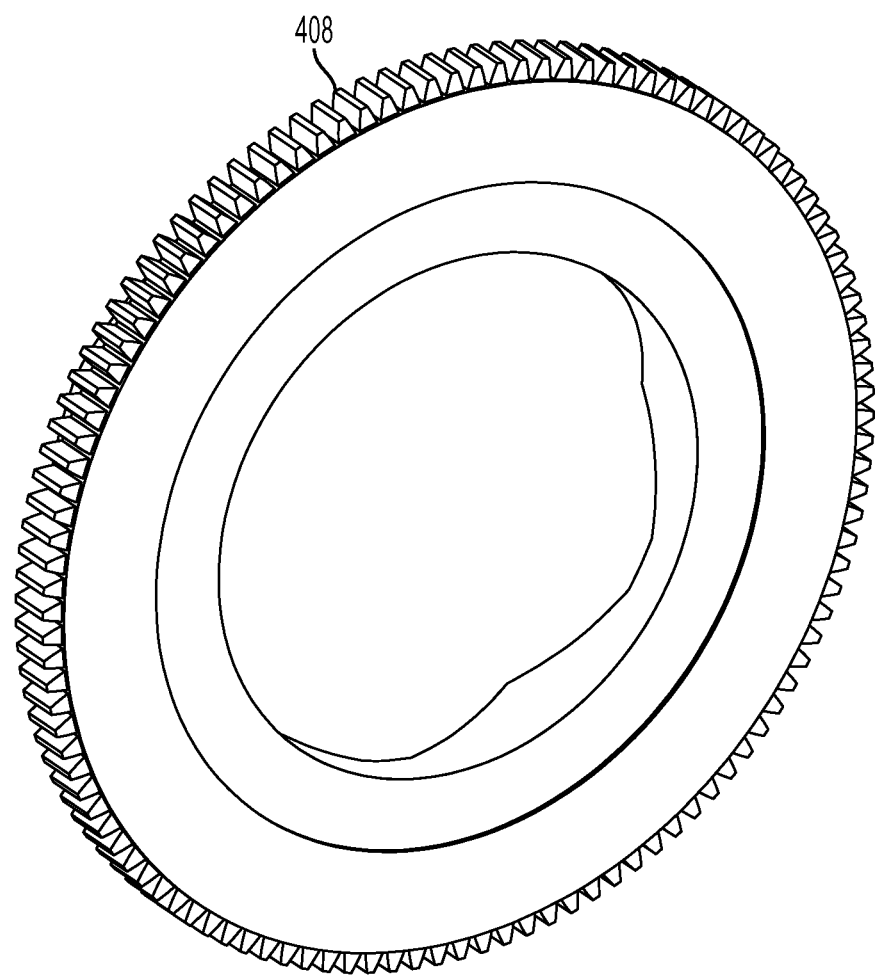
FIG. 4B is a view of a second side of the cam plate.
Figure 5:
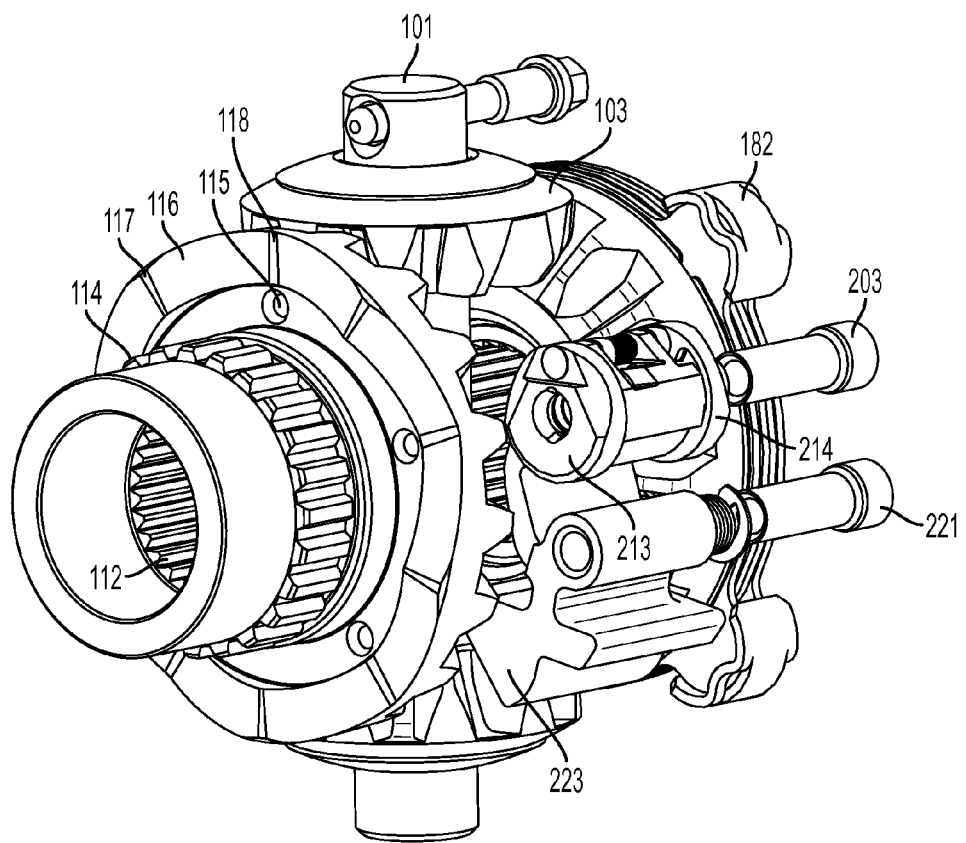
FIG. 5 is a view of a partially assembled differential showing a ramped side of a side gear.
Figure 6:
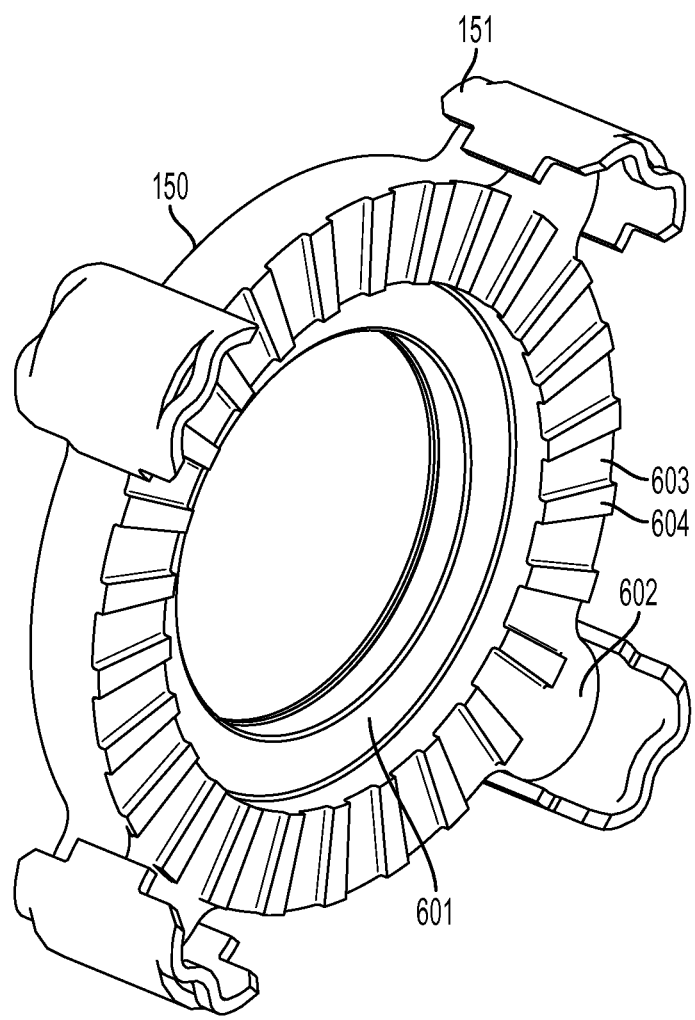
FIG. 6 is a view of an eared lock plate.
Figure 7:
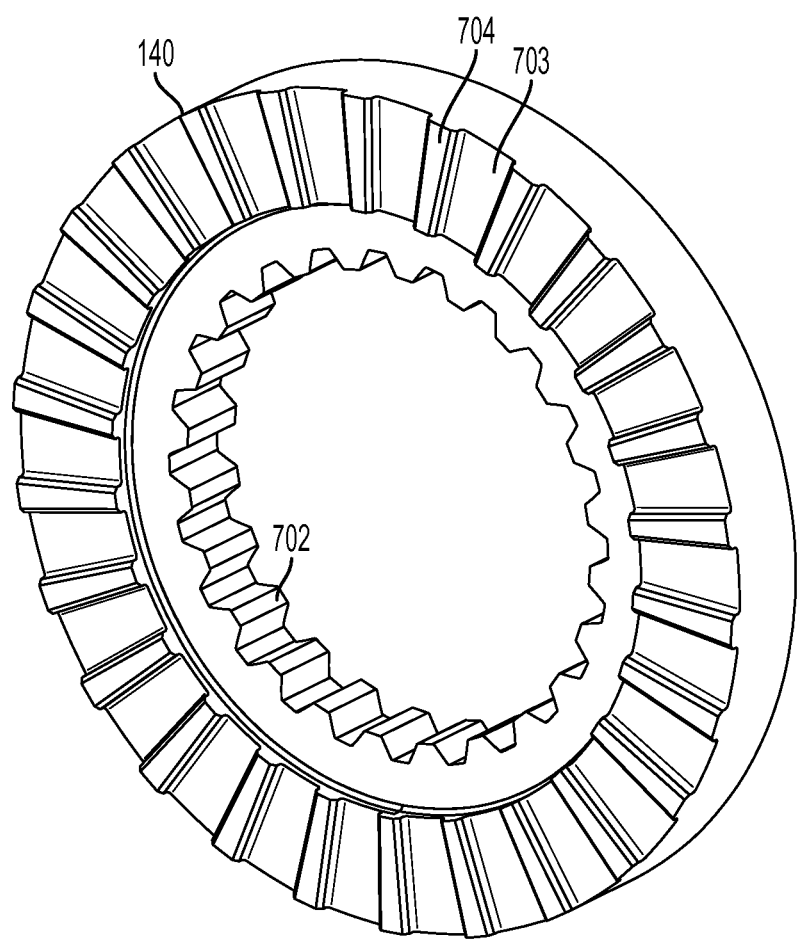
FIG. 7 is a view of a splined lock plate.

As shown in FIGS. 4A and 4B, the cam plate 120 has ramps 402 and valleys 403. The ramps 402 comprise upward ramps 405 leading to crests 404. The valleys 403 comprise downward ramps 406 leading to ravines 407. The ramps 402 and valleys 403 are shown with stepwise transitions, and the cam plate 120 can comprise more or fewer stepwise transitions, or the cam plate 120 can comprise smooth transitions between crests 404 and ravines 407 such as by having a single slope therebetween or by having curves therebetween. Also, while five crests 404 and five ravines 407 are shown, more or fewer can be used in practice.

Also shown in FIG. 4A are detents 401. While three detents 401 are shown, more or fewer can be used in practice. The detents 401 mate with corresponding holes 115 in the left side gear 110. The detents 401 and holes 115 are sized so that the detents 401 leave the holes 115 when the above locking of the flyweight 210 or 211 against the pawl 222 creates sufficient force to move the cam plate 120. The ramps 402 then slide against corresponding side gear ramps 116. That is, in the open mode, crests 404 rest in side gear ravines 118, and side gear crests 117 rest in ravines 407. In the locked mode, the crests "ramp-up" and slide out of the ravines and against opposed ramps as the detents 401 leave the holes 115. When the differential exits locked mode, the crests "ramp-down" and slide back in to corresponding ravines while the detents 401 re-enter the holes 115.

Cam plate action against the side gear, as well as cam plate and side gear configurations, may be further understood from examples such as U.S. Pat. Nos. 3,606,803, 5,484,347, 6,319,166, RE 28,004, and U.S. Pat. No. 3,831,462, incorporated herein by reference in their entirety.

The left side gear 110 is braced against the pinion gears 103 and 104 via meshing engagement of side gear teeth 111 with pinion gear teeth. Any motion of the left side gear 110 as the cam plate 120 "ramps-up" can be passed to the spring-loaded lock plates.

In the example shown, no reaction block is used to pass force from the left side gear 110 to the right side gear 190. Therefore, the "ramp-up" of the cam plate does not also cause compression of the clutch pack 180. The clutch pack 180 can be operated to enable limited slip, or the clutch pack 180 can be eliminated.

The forces created as the cam plate 120 moves against the left side gear 110 can be transferred to the first lock plate 140 and then to the second lock plate 150, with some absorption by wave spring 130. Such an arrangement enables the elimination of all wet clutch packs and the use of a reaction block, thus simplifying the differential, reducing weight, and enabling reduction of size. The right side gear 190 can abut the differential case similar to the above-incorporated RE 28,0004 and U.S. Pat. No. 3,831,462 or can be used with other designs having no friction discs adjacent the right side gear.

As the cam plate 120 "ramps-up," first lock plate 140 moves axially with its lock plate inner splines 702 along left side gear outer splines 114. This compresses a wave spring 130 and first lock plate teeth 704 lock against second lock plate teeth 604. Each first lock plate tooth 704 is separated by a lock plate groove 703. Each second lock plate tooth 604 is likewise separated by a plate groove 603.

The wave spring 130 seats against wave spring seat 601. The wave spring 130 biases the first lock plate 140 away from the second lock plate 150. As the wave spring 130 pushes against first lock plate 140, first lock plate 140 pushes against cam plate 120. This biases the detents 401 in the holes 115.

In embodiments where the second lock plate 150 comprises ears 602, optional ear guards 151 can be included. The ears 602 and optional ear guards 151 engage with corresponding grooves in the differential case so as to lock the second lock plate 150 from rotating with respect to the case. The first lock plate 140 is forced to rotate with the left side gear 110 via the mating of inner splines 702 with side gear outer splines 114.

An optional coupling ring 160 or thrust washer abuts the second lock plate 150, and an optional coupling ring or thrust washer 170 abuts the side gear 110 and differential case.

When the first lock plate teeth 704 lock against second lock plate teeth 604, the left side gear 110 is locked to rotate with the differential case. The pinion shaft 101, locked to the differential case via optional lock pin 102, must also rotate with the housing. Affiliated pinion gears 103 and 104 are locked to rotate with the left side gear 110 via the meshing of side gear teeth 111 with the pinion gear teeth. Thus, the meshed side gear teeth 191 of right side gear 190 must rotate at the same rate as the left side gear 110. This gear coupling is in addition to the coupling between the right side gear 190 and the differential case, described below.

Right side gear 190 further includes inner spline 192 for coupling to an axle shaft and an outer spline 194 for coupling to clutch pack 180. The clutch pack 180 can comprise plates with ears 184 and friction discs with splines 181. The disc splines 181 couple to the right side gear outer spline 194. Optional ear guards 182 surround the ears 184, which mate with corresponding grooves in the differential case. A coupling ring 183 or thrust washer is between the differential case and the clutch pack 180.

Because the ears 184 are coupled to the differential case, when the affiliated friction discs are frictionally engaged with the eared plates, the right side gear 190 must rotate, via the spline connection, with the differential case. The friction engagement of the clutch pack 180 can be facilitated by the selection of an appropriate viscosity lubricating fluid. The clutch pack 180 can be used to provide limited slip capability to the differential, or as an alternative the clutch pack 180 can be eliminated.

The first lock plate 140 comprises radially extending teeth sized and spaced to mate with radially extending teeth of the second lock plate 150. In an open mode, the space between first lock plate 140 and second lock plate 150 is sized so that the crests 404 of the cam plate 120 rest in ravines 118 of the left side gear. The spacing is selected so that the crests 404 of the camp plate 120 do not pass crests 117 of the left side gear when the cam plate 120 locks. The design enables positive locking such that the differential operates either fully locked or in open mode.

Because of the simplified design, the differential can lock in both directions. That is, the differential can lock no matter which direction the side gears are spinning so long as one of the flyweights 210 or 211 can catch the pawl 222.

An advantage of using the two lock plates is the enhanced reliability offered by the tooth-to-tooth contact. That is, the dog-style coupling is more reliable than the wet friction disc contact, resulting in reduced slippage. In addition, the lock plates can be designed to take up less axial space than friction discs, thus further reducing the size of the differential. The lock plate engagement and use generates less heat than the friction discs, leading to less fluid degradation. And, the elimination of the friction discs reduces the machining to the differential case, leading to less costly manufacture.

Other implementations will be apparent to those skilled in the art from consideration of the specification and practice of the examples disclosed herein. It is intended that the specification and examples be considered as exemplary only, with a true scope and spirit of the invention being indicated by the following claims.

What is claimed is:

1. A differential comprising:
a first side gear comprising gear teeth and ramps;
a second side gear comprising gear teeth facing the first side gear;
a pinion gear set between the first side gear and the second side gear;
a cam plate comprising ramps facing the ramps of the first side gear, the cam plate further comprising a second side;
a first lock plate comprising a first side abutting the second side of the cam plate, the first lock plate further comprising locking teeth; and
a second lock plate comprising locking teeth facing the locking teeth of the first lock plate.

2. The differential of claim 1, wherein the locking teeth of the first lock plate comprises axially extending teeth, and wherein the toothed side of the second lock plate comprises axially extending teeth.

3. The differential of claim 2, wherein, when the cam plate is moved into the locked mode, the locking teeth of the first lock plate engage the locking teeth of the second lock plate.

4. The differential of claim 2, wherein the cam plate further comprises a plurality of cam plate crests and a plurality of cam plate ravines, wherein the side gear further comprises a plurality of side gear crests and a plurality of side gear ravines, and wherein the cam plate is movable between an open mode, where the cam plate crests align in the side gear ravines and the side gear crests align in the cam plate ravines, and a locked mode, where the cam plate crests slide towards the side gear crests and away from the side gear ravines.

5. The differential of claim 1, further comprising a wave spring between the first lock plate and the second lock plate to bias the first lock plate away from the second lock plate.

6. The differential of claim of claim 5, wherein the second lock plate further comprises a recessed wave spring seat abutting the wave spring.

7. The differential of claim 1, wherein the first side gear comprises an outer spline, and wherein the first lock plate comprises an inner spline in engagement with the outer spline of the first side gear.

8. The differential of claim 7, wherein:
the second lock plate further comprises radially extending ears for engaging ear grooves of a differential case,
the cam plate comprises rim teeth,
the differential further comprises a mechanical device for selectively locking against the cam plate, and, when the mechanical device locks against the cam plate, the cam plate rotates with respect to the first side gear and the cam plate presses the first lock plate against the second lock plate for rotationally locking the first side gear.

9. The differential of claim 8, wherein the cam plate further comprises a plurality of cam plate crests and a plurality of cam plate ravines, wherein the side gear further comprises a plurality of side gear crests and a plurality of side gear ravines, and wherein the cam plate is movable between an open mode, where the cam plate crests align in the side gear ravines and the side gear crests align in the cam plate ravines, and a locked mode, where the cam plate crests slide towards the side gear crests and away from the side gear ravines.

10. The differential of claim 1, wherein the second lock plate further comprises radially extending ears for seating in in ear grooves of a case.

11. The differential of claim 1, wherein the cam plate comprises rim teeth, wherein the differential further comprises a mechanical device for selectively locking against the cam plate, and, when the mechanical device locks against the cam plate, the cam plate rotates with respect to the first side gear and the cam plate presses the first lock plate against the second lock plate.

12. The differential of claim 11, wherein, when the cam plate is moved into the locked mode, the locking teeth of the first lock plate engage the locking teeth of the second lock plate.

13. The differential of claim 1, further comprising:
a wet clutch pack abutting the second side gear.

14. The differential of claim 1, wherein the first side gear further comprises:
a neck extending away from the ramps on the first side gear;
a plurality of side gear crests and a plurality of side gear ravines; and
outer splines between the neck and the plurality of side gear crests and the plurality of side gear ravines, and
wherein the first lock plate comprises a set of inner splines and the first lock plate is splined to the outer splines on the first side gear, and
wherein the neck of the first side gear rotates within the second lock plate.

15. The differential of claim 1, wherein the cam plate further comprises a plurality of cam plate crests and a plurality of cam plate ravines, wherein the side gear further comprises a plurality of side gear crests and a plurality of side gear ravines, and wherein the cam plate is movable between an open mode, where the cam plate crests align in the side gear ravines and the side gear crests align in the cam plate ravines, and a locked mode, where the cam plate crests slide towards the side gear crests and away from the side gear ravines.

16. The differential of claim 15, wherein, when the cam plate is moved into the locked mode, the locking teeth of the first lock plate engage the locking teeth of the second lock plate.

17. The differential of claim 15, wherein the side gear further comprises holes, wherein the cam plate further comprises detents, and wherein the cam plate is movable between an open mode, where respective holes align with respective detents, and a locked mode, where the respective detents move out of the respective holes.

18. The differential of claim 1, wherein the side gear further comprises holes, wherein the cam plate further comprises detents, and wherein the cam plate is movable between an open mode, where respective holes align with respective detents, and a locked mode, where the respective detents move out of the respective holes.

* * * * *